May 1, 1923.                    1,453,891
J. W. SIVLEY
CULTIVATOR FENDER
Filed May 11, 1920              2 Sheets-Sheet 1

Joseph W. Sivley, INVENTOR
BY Victor J. Evans
ATTORNEY

May 1, 1923.

J. W. SIVLEY

CULTIVATOR FENDER

Filed May 11, 1920

Joseph W. Sivley INVENTOR

BY Victor J. Evans ATTORNEY

Patented May 1, 1923.

1,453,891

UNITED STATES PATENT OFFICE.

JOSEPH W. SIVLEY, OF TRINITY, ALABAMA.

CULTIVATOR FENDER.

Application filed May 11, 1920. Serial No. 380,573.

*To all whom it may concern:*

Be it known that I, JOSEPH W. SIVLEY, a citizen of the United States, residing at Trinity, in the county of Morgan and State of Alabama, have invented new and useful Improvements in Cultivator Fenders, of which the following is a specification.

The object of my present sole invention is the provision of a cultivator fender constructed with a view to supplying dirt to plants when necessary, and adapted when trash is in the way, to protect the plants; the disks of the fender being provided with radial teeth, so that the amount of dirt may be regulated, and so that the disks will roll irrespective of the height at which they are adjustably positioned.

To the attainment of the foregoing, the invention consists in the peculiar and advantageous fender and in the combination of the same with a cultivator of the type defined, as hereinafter described and definitely claimed.

In the accompanying drawings, hereby made a part hereof:

Similar numerals of reference designate corresponding parts in all of the views of the drawings.

Figure 1:
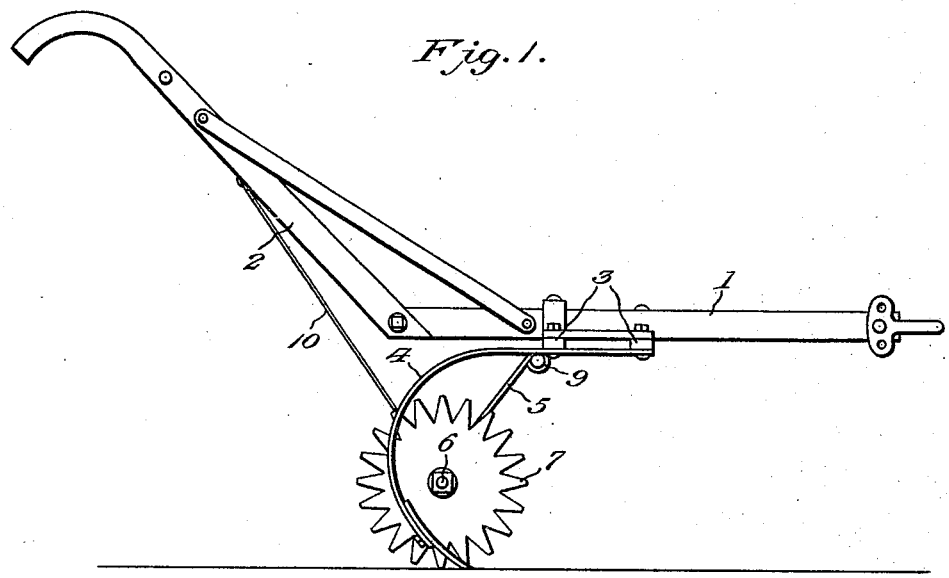
Figure 1 is a side elevation showing a cultivator equipped with my novel fender.
Figure 2:
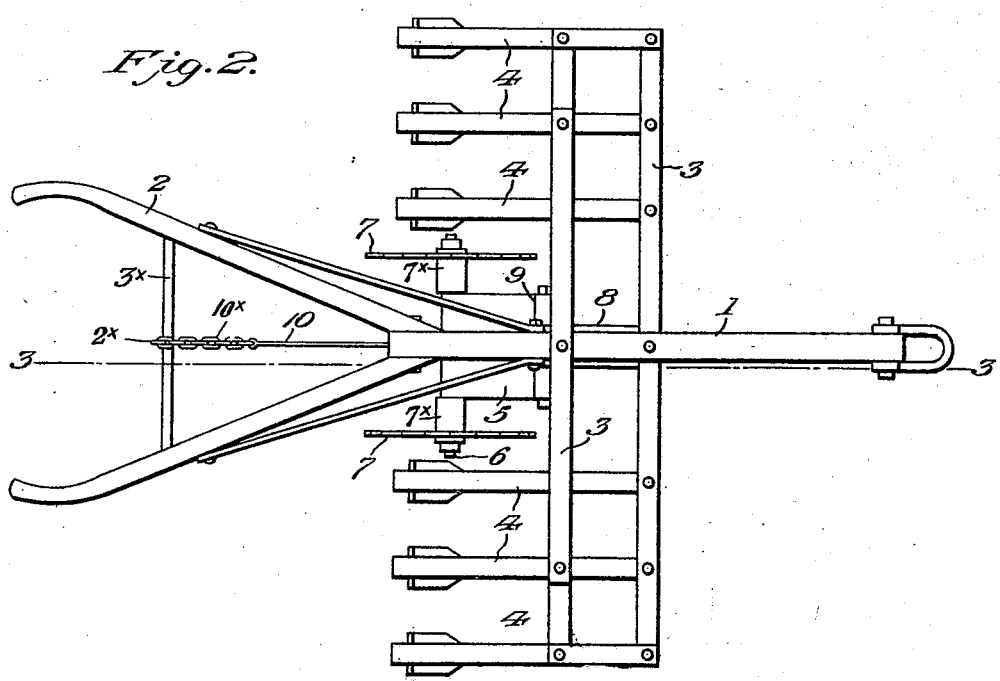
Figure 2 is a top plan view of the same.
Figure 3:
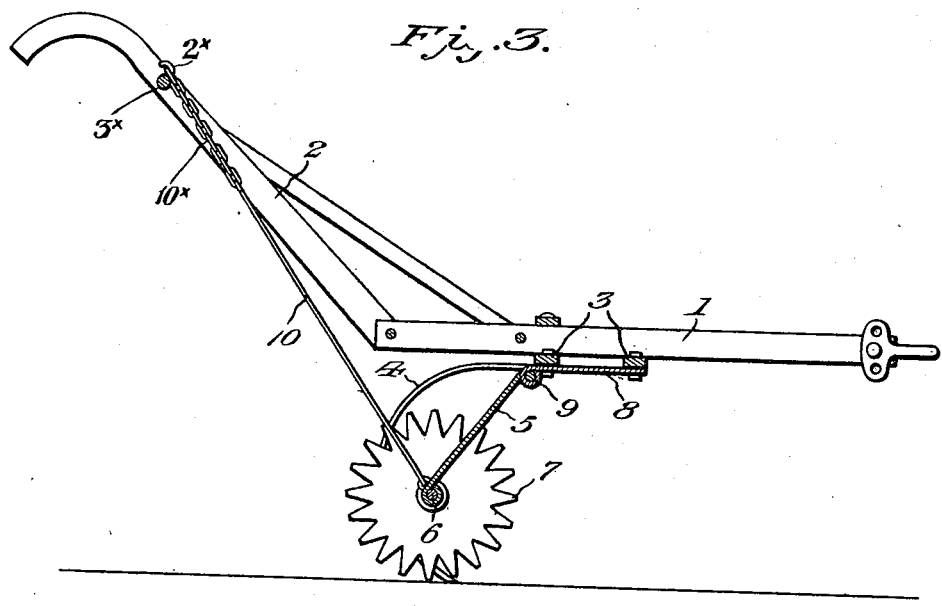
Figure 3 is a longitudinal vertical section taken in the plane indicated by the line 3—3 of Figure 2.
Figure 4:
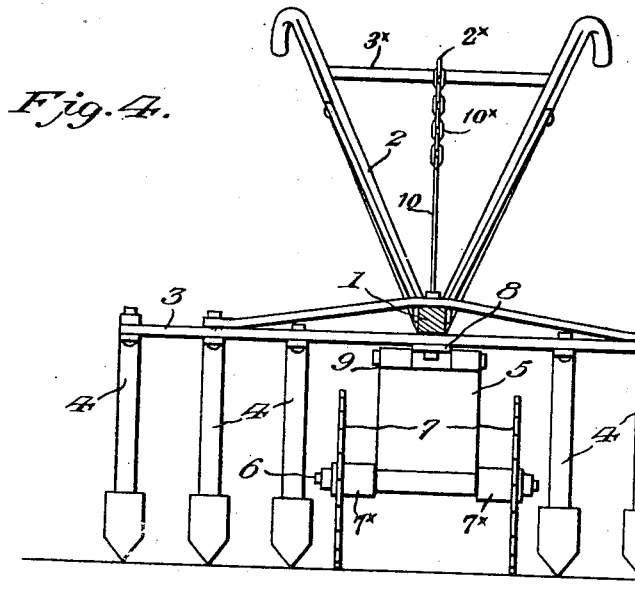
Figure 4 is a transverse section taken through the cultivator in a plane in front of the rolling disks of the fender.

The cultivator illustrated comprises a beam 1, handles 2 fixed to the rear portion thereof, transverse bars 3 fixed to the beam and extending laterally from opposite sides thereof, and two groups of curvilinear cultivator teeth 4 carried by the said bars 3, and arranged with one group at one side of the beam 1, and the other group at the opposite side of said beam, and also arranged with the two groups of teeth separated by an intervening space, as illustrated.

In furtherance of my invention, I arrange my novel fender in the intervening space alluded to, and I have the fender comprise a plate-like swinging hanger 5, a transverse shaft 6 journaled and held against endwise movement in a barrel formed at the lower end of the hanger, and equipped at its ends with rolling toothed disks 7, a metallic bar 8 fixed to the beam 1 and to which the upper end of the hanger 5 is hinged at 9, and means whereby the operator of the cultivator is enabled, when necessary, to raise the hanger 5 and the disks 7. The latter means is preferably in the form of a rod 10 and a chain $10^\times$ adapted to be adjustably fixed to a hook $2^\times$ on a cross rod $3^\times$ of the handles 2 as illustrated, so that the operator is enabled to adjustably fix or position the disks 7 at various heights for operation, according to the conditions encountered. The disks 7 are provided with hubs $7^\times$ that abut against the edges of the hanger 5.

In the practical operation of my improvement it will be manifest that the rolling toothed disks will enable the operator to supply dirt to the plants as desired, and will also operate to protect the plants against trash; it being noticed in this connection that the disks 7 are arranged in the same transverse plane as the working portions of the teeth 4. It will also be manifest that the weight of the fender is sufficient to hold the same downwardly to its work, and when the plants require more soil, the fender disks may be easily raised through the medium of the cable, and when necessary or desirable the operator can adjustably or detachably secure the disks in the raised position.

Having described my invention, what I claim and desire to secure by Letters-Patent, is:

In a cultivator, the combination of a beam, handles fixed thereto, transverse bars fixed to and extending laterally at opposite sides of the beam, a metallic bar fixed to the undersides of the said transverse bars and arranged in the same vertical plane as the beam, cultivator teeth carried by the said transverse bars and arranged at opposite sides of a space extending at opposite sides of the vertical plane of the beam, a vertically-swinging plate-like hanger hingedly connected at its forward end to the said metallic bar and having portions arranged at opposite sides of the rear end of said bar and also having a barrel at its lower end, a shaft in said barrel, rolling toothed disks on said shaft and maintained in spaced relation to the edges of the hanger, means carried by the handles, and means connected to the hanger and constructed and arranged to be adjustably connected to the said means on the handles.

In testimony whereof I affix my signature.

JOSEPH W. SIVLEY.